United States Patent
Henzler et al.

(10) Patent No.: US 12,085,020 B1
(45) Date of Patent: Sep. 10, 2024

(54) APPARATUS AND PROCESS FOR GAS TURBINE AIR FILTRATION AND FUEL VAPORIZATION

(71) Applicant: Air Products and Chemicals, Inc., Allentown, PA (US)

(72) Inventors: Gregory W. Henzler, Emmaus, PA (US); Paul D. Altpeter, Bethlehem, PA (US); Ghassan Altimany, North Wales, PA (US); Tito Paratico, London (GB)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 18/238,636

(22) Filed: Aug. 28, 2023

(51) Int. Cl.
| | |
|---|---|
| *F02C 7/052* | (2006.01) |
| *B01D 46/00* | (2022.01) |
| *B01D 46/42* | (2006.01) |
| *B01D 46/62* | (2022.01) |
| *F02C 7/141* | (2006.01) |
| *F02C 7/224* | (2006.01) |
| *F23R 3/04* | (2006.01) |
| *F23R 3/30* | (2006.01) |

(52) U.S. Cl.
CPC .......... *F02C 7/052* (2013.01); *B01D 46/0031* (2013.01); *B01D 46/4263* (2013.01); *B01D 46/62* (2022.01); *F02C 7/141* (2013.01); *F02C 7/224* (2013.01); *F23R 3/04* (2013.01); *F23R 3/30* (2013.01); *B01D 2279/60* (2013.01); *F05D 2260/20* (2013.01)

(58) Field of Classification Search
CPC ....... B01D 2279/60; F02C 7/141; F02C 7/224
See application file for complete search history.

(56) References Cited

U.S. PATENT DOCUMENTS

| | | | | |
|---|---|---|---|---|
| 3,978,663 | A * | 9/1976 | Mandrin | ................ F02C 7/143 62/50.2 |
| 6,752,620 | B2 | 6/2004 | Heier et al. | |
| 11,592,178 | B2 | 2/2023 | D'Agostini et al. | |
| 2013/0127163 | A1 | 5/2013 | Palamara et al. | |
| 2020/0088098 | A1 * | 3/2020 | Roberge | ................... F02C 7/16 |
| 2022/0268444 | A1 | 8/2022 | D'Agostini et al. | |

FOREIGN PATENT DOCUMENTS

CN 114876641 A 8/2022

\* cited by examiner

*Primary Examiner* — Scott J Walthour
(74) *Attorney, Agent, or Firm* — Matthew R. Weaver

(57) ABSTRACT

An apparatus and process can be configured for filtering and cooling air to be fed to a gas turbine while also vaporizing at least a portion of fuel to be fed to the gas turbine. Intake air can be passed through a filter house for filtration. While passing through the filtration house, a liquid fuel can be passed through the filter house to be vaporized or partially vaporized therein via heat exchange with the air passing through the filter house, which can also cool the air as it is passing through the filter house. Filtered, cooled air can be output from the filter house for feeding to a gas turbine as an oxidant while the at least partially vaporized fuel can also be output from the filter house for feeding to the gas turbine for being combusted therein.

19 Claims, 6 Drawing Sheets

APPARATUS AND PROCESS FOR GAS TURBINE AIR FILTRATION AND FUEL VAPORIZATION

FIELD

The present innovation relates to gas turbines, operations of gas turbines, and processes for filtering and cooling air to be fed to a gas turbine while also vaporizing at least a portion of fuel to be fed to the gas turbine.

BACKGROUND

Gas turbines can combust a fuel for generation of power or work. Examples of different types of gas turbines and arrangements for gas turbines can be appreciated from U.S. Pat. Nos. 11,592,178 and 6,752,620, U.S. Patent Application Publication Nos. 2022/0268444 and 2013/0127163, and Chinese Patent Publication No. CN114876641A.

SUMMARY

We determined that gas turbine arrangements can be configured to utilize a fuel that may result in an inefficient use of energy for vaporizing the fuel for feeding to a gas turbine. For example, fuel may be stored as cryogenic liquid (e.g. liquid natural gas or liquid hydrogen) or a cold liquid (e.g. liquid ammonia) and the energy utilized to form the cold liquid can be lost when that fuel is vaporized (e.g. via ambient air vaporizers). We determined that at least some of this liquid fuel can be fed to an air intake filter for vaporization in the filtration device while intake air is being passed through the filtration device for being fed to the gas turbine as an oxidant. We determined that this type of approach can permit the air to be cooled as it is filtered to provide improved performance as an oxidant in the gas turbine while also providing a heating medium for vaporization of at least some of the fuel for feeding that fuel to the gas turbine for being combusted therein. We also determined that such an approach can help prevent heat exchanger fouling by facilitating the heat exchange between the air and the fuel after the air has passed through at least one filter mechanism to remove particulates from the air.

We determined that embodiments of our apparatus and process can facilitate improved gas turbine operation to permit a more efficient, cost effective approach for vaporization of fuel and pre-treating of air for feeding to the gas turbine as an oxidant. Embodiments can also provide enhanced operational flexibility such that fuel vaporization via the air intake filter may only occur when needed to help cool the air to a desired feed temperature to provide more flexibility to account for changes in ambient conditions and gas turbine operational demands.

We have determined that embodiments can also permit more efficient use of the cold of a cryogenic liquid fuel (e.g. liquid natural gas or liquid hydrogen) or cold of a liquified fuel that may be at a relatively cold temperature (e.g. liquid ammonia, which may be stored at a temperature of between $-6°$ C. to $-35°$ C. or $-30°$ C. and $-33°$ C.) that is stored as a source of fuel for the gas turbine so that less of the energy utilized to cool the fuel to a liquid is lost when the fuel is fed to a gas turbine for being combusted therein. The improved energy efficiency can permit a more environmentally friendly operation of gas turbines to be provided that also provides reduced operational costs.

In some embodiments, the fuel that can be utilized can be ammonia and/or natural gas. Such fuels can be stored as a cryogenic liquid or a cold liquid and subsequently vaporized for being fed to the gas turbine for combustion therein. In situations where the fuel is ammonia, the ammonia can be provided via a green ammonia manufacturing process (e.g. use of renewable power to form the ammonia from electrolysis of water to form hydrogen and air separation to provide the nitrogen for forming the ammonia). Such embodiments can provide gas turbine operations that can occur more efficiently while also providing a relatively minimal environmental impact, or a significantly reduced environmental impact.

In a first aspect, an apparatus for filtering and cooling air to be fed to a gas turbine while also vaporizing at least a portion of fuel to be fed to the gas turbine is provided. The apparatus can include an inlet filter unit having at least one filter element comprising a first filter element. The inlet filter unit can also have a heat exchanger positioned downstream of the first filter element to receive liquid fuel from a fuel storage tank to vaporize the fuel via air passed through the inlet filter unit and to cool the air. The inlet filter unit can be positionable to output air after the air is passed through the at least one filter element and the heat exchanger to feed the air to a combustion chamber of a gas turbine. The heat exchanger of the inlet filter unit can be configured and positioned to output the fuel so the fuel is at least partially vaporized for feeding to the combustion chamber of the gas turbine.

In some embodiments, the fuel can be ammonia, hydrogen or natural gas or be comprised of ammonia, hydrogen or natural gas (e.g. methane). The fuel can be liquid or mostly liquid when fed to the heat exchanger of the inlet filter unit and can be entirely vaporized when output from the heat exchanger. In other embodiments, the fuel can be partially vaporized when output from the heat exchanger (e.g. be a mixture of heated liquid and gas). Such partially vaporized fuel can be mixed with other vaporized fuel for complete vaporization of the fuel prior to feeding the fuel to the combustion chamber as a gaseous fuel in such embodiments.

In a second aspect, the at least one filter element can include more than the first filter element. For example, the at least one filter element can also comprise a second filter element. The heat exchanger can be positioned between the first filter element and the second filter element.

In other embodiments, the first filter element can be configured to remove particulates from the air and the second filter element downstream of the first filter element can be configured to remove particulates and/or liquid water from the air. The heat exchanger can be positioned downstream of the first filter element and also be positioned downstream of the second filter element.

As another example, the at least one filter element can also include a third filter element that is downstream of the second filter element. The first filter element can be configured to remove particulates from the air, the second filter element can be configured to remove liquid water and/or condensate from the air, and the third filter element can be configured to remove particulates and/or liquid water from the air.

In some embodiments, the third filter element can be positioned downstream of the heat exchanger and the third filter element can be configured to remove liquid water and/or condensate from the air. For example, the third filter element can be spaced apart from the heat exchanger or a condensate drainage system downstream of the heat exchanger by a pre-selected condensate falling distance (CFD).

As yet another example, the at least one filter element can include a second filter element and the heat exchanger can be positioned downstream of the first filter element and can also be positioned upstream of the second filter element. The second filter element can be spaced apart from the heat exchanger or a condensate drainage system downstream of the heat exchanger by a pre-selected condensate falling distance (CFD). In some configurations, the at least one filter element can also include a third filter element that is downstream of the second filter element and the first filter element can be configured to remove particulates from the air, the second filter element can be configured to remove liquid water and/or condensate from the air, and the third filter element can be configured to remove particulates and/or liquid water from the air.

In yet other embodiments, the at least one filter unit can include more than three filter elements. Each additional filter element can be positioned to help remove particulates and/or liquid from the air that is cooled via the vaporization of fuel that can occur via the heat exchanger.

In a third aspect, the inlet filter unit can have a condensate drainage system positioned downstream of the heat exchanger. The condensate drainage system can also (or alternatively) be integrated with the heat exchanger to facilitate drainage of condensate that may form via the cooling of the air that can occur via the fuel vaporization due to the transfer of heat from the air to the liquid fuel to vaporize the fuel.

In a fourth aspect, the apparatus of the first aspect can include one or more features of the second aspect and/or the third aspect. It should therefore be appreciated that different embodiments can include other features or combinations of features. Examples of different features that can be included in an exemplary embodiment can be appreciated from the discussion of exemplary embodiments discussed herein.

In a fifth aspect, a process for filtering and cooling air to be fed to a gas turbine while also vaporizing at least a portion of fuel to be fed to the gas turbine is provided. The process can include feeding air into an inlet filter unit for filtration of the air, feeding a portion of liquid fuel into a heat exchanger of the inlet filter unit for vaporization of the portion of the fuel via heat exchange with the air passing through the inlet filter unit, outputting at least partially vaporized fuel from the heat exchanger of the inlet filter unit to a gas turbine and outputting filtered air from the inlet filter unit that is cooled via the heat exchange with the fuel to the gas turbine.

Embodiments of the process can be utilized in conjunction with different types of fuels. In some embodiments, the fuel can include ammonia, hydrogen or natural gas (e.g. methane) or be ammonia, hydrogen or natural gas, for example.

In some embodiments of the process, the fuel can be liquid or mostly liquid when fed to the heat exchanger of the inlet filter unit and can be entirely vaporized when output from the heat exchanger. In other embodiments, the fuel can be partially vaporized when output from the heat exchanger (e.g. be a mixture of heated liquid and gas). Such partially vaporized fuel can be mixed with other vaporized fuel for complete vaporization of the fuel prior to feeding the fuel to the combustion chamber as a gaseous fuel in such embodiments.

In a sixth aspect, the process can include other steps. For example, the process can also include removing condensate formed as the air passes through the inlet filter unit. As another example, the process can include feeding another portion of the liquid fuel to a vaporizer to vaporize the fuel and mixing the vaporized fuel output from the vaporizer with the fuel output from the heat exchanger of the inlet filter unit before the fuel is fed to the gas turbine. As yet another example, the process can also include filtering the air to remove particulates from the air as the air passes through the inlet filter unit.

As yet another example, the process can include cycling between cooling of air and also vaporization of fuel via an inlet filter unit and subsequently cessation of feeding fuel to a heat exchanger of an inlet filter unit for cooling of air so that all fuel is vaporized via another vaporization mechanism (e.g. ambient air vaporizer, etc.). Such cycling can be configured to occur based on gas turbine operational data and/or ambient air condition data, for example.

In a seventh aspect, the process can include removing liquid water and/or condensate from the air as it passed through the inlet filter unit.

In an eighth aspect, the process can utilize or be implemented via an embodiment of our apparatus for filtering and cooling air to be fed to a gas turbine while also vaporizing at least a portion of fuel to be fed to the gas turbine.

In such embodiments, the inlet filter unit can include a plurality of filter elements comprising a first filter element and a second filter element wherein at least one of the filter elements is upstream of the heat exchanger. As discussed above, the filter elements can also include additional filter elements (e.g. a third filter element, a fourth filter element, etc.). In some embodiments, the first filter element can be configured to remove particulates from the air and the second filter element can be configured to remove liquid water and/or condensate from the air or the second element can be configured to remove particulates and/or liquid water from the air. In some configurations, a third filter element can also be positioned downstream of the heat exchanger and the first filter element can be configured to remove particulates from the air, the second filter element can be configured to remove liquid water and/or condensate from the air, and the third filter element can be configured to remove particulates and/or liquid water from the air.

In a ninth aspect, the process of the fifth aspect can include one or more features of the sixth aspect, seventh aspect, and/or the eighth aspect. It should therefore be appreciated that different embodiments can include other features or combinations of features. Examples of different features that can be included in an exemplary embodiment can be appreciated from the discussion of exemplary embodiments discussed herein.

In a tenth aspect, a turbine apparatus is provided. The turbine apparatus can include an inlet filter unit having at least one filter element comprising a first filter element and a heat exchanger positioned downstream of the first filter element to receive liquid fuel to vaporize the fuel via air passed through the inlet filter unit to cool the air. The inlet filter unit can be positionable to output air after the air is passed through the filter elements to feed the air to a combustion chamber of a gas turbine. The heat exchanger can be configured and positioned to output the fuel so the fuel is vaporized for feeding to the combustion chamber of the gas turbine.

Embodiment of the gas turbine apparatus can be configured to implement an embodiment of the process for filtering and cooling air to be fed to a gas turbine while also vaporizing at least a portion of fuel to be fed to the gas turbine is provided. Embodiments of the turbine apparatus can also be configured to include an embodiment of the inlet filter unit of an embodiment of the apparatus for filtering and cooling air to be fed to a gas turbine while also vaporizing at least a portion of fuel to be fed to the gas turbine is provided.

It should be appreciated that embodiments of the process and apparatus can utilize various conduit arrangements and process control elements. The embodiments may utilize sensors (e.g., pressure sensors, temperature sensors, flow rate sensors, concentration sensors, etc.), controllers, valves, piping, and other process control elements. Some embodiments can utilize an automated process control system and/or a distributed control system (DCS), for example. Various different conduit arrangements and process control systems can be utilized to meet a particular set of design criteria.

Other details, objects, and advantages of our gas turbine apparatus, apparatus for filtering and cooling air to be fed to a gas turbine while also vaporizing at least a portion of fuel to be fed to the gas turbine, process for gas turbine operations, process for filtering and cooling air to be fed to a gas turbine while also vaporizing at least a portion of fuel to be fed to the gas turbine, and methods of making and using the same will become apparent as the following description of certain exemplary embodiments thereof proceeds.

BRIEF DESCRIPTION OF THE DRAWINGS

Exemplary embodiments of our process for gas turbine operations, a gas turbine apparatus, a system for gas turbine operation, a process for filtering and cooling air to be fed to a gas turbine while also vaporizing at least a portion of fuel to be fed to the gas turbine, an apparatus for filtering and cooling air to be fed to a gas turbine while also vaporizing at least a portion of fuel to be fed to the gas turbine, and methods of making and using the same are shown in the drawings included herewith. It should be understood that like reference characters used in the drawings may identify like components.

DETAILED DESCRIPTION

Figure 1:
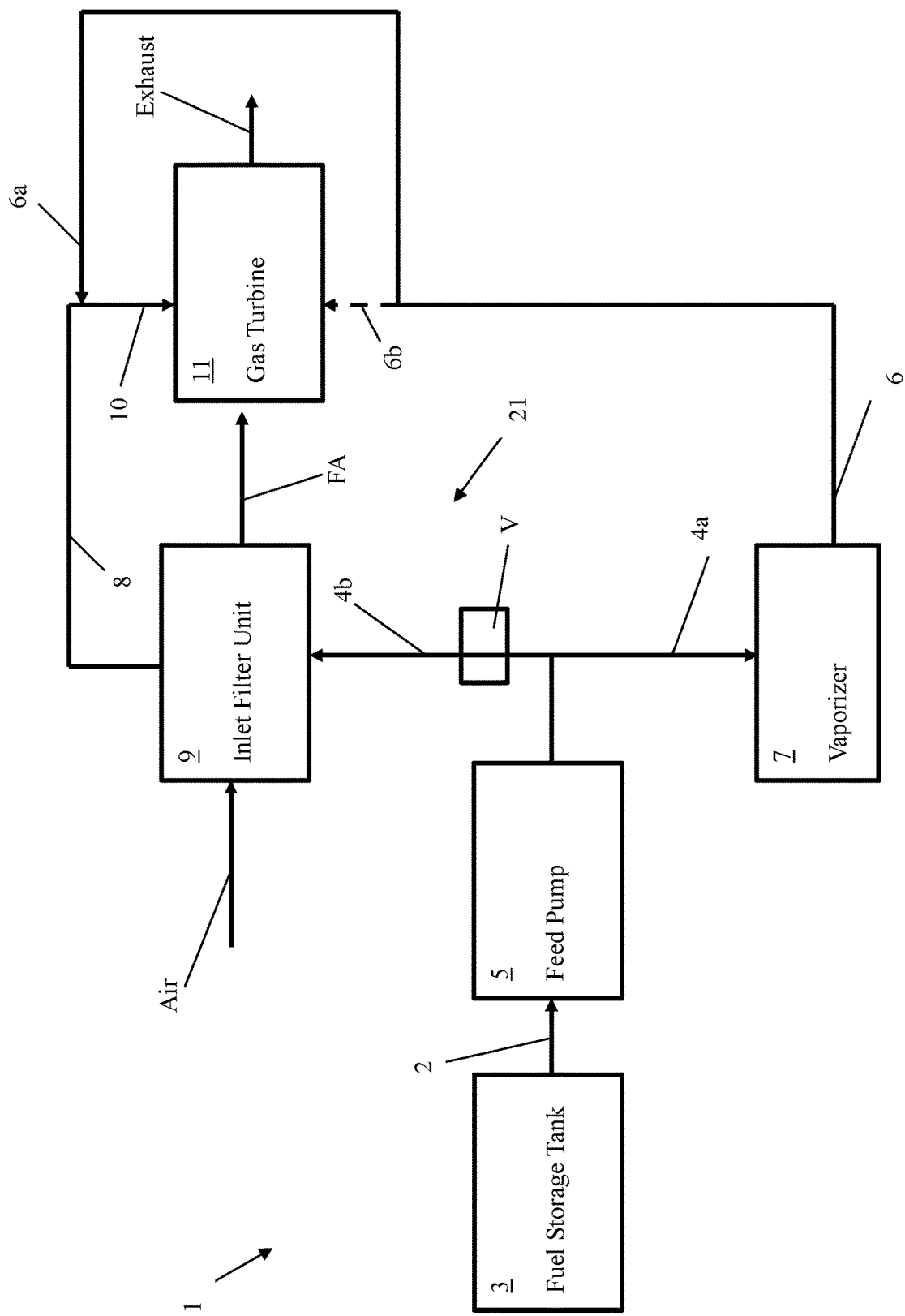
FIG. 1 is a block diagram of a first exemplary embodiment of a gas turbine apparatus 1, which can include an exemplary embodiment of an apparatus for filtering and cooling air to be fed to a gas turbine while also vaporizing at least a portion of fuel to be fed to the gas turbine 21.

Referring to FIGS. 1-5, a gas turbine apparatus 1 can include a source of fuel that can be stored in a fuel storage tank 3. The fuel storage tank 3 can include at least one vessel configured to store the fuel as a cryogenic liquid (e.g. liquid natural gas) or as a liquid (e.g. liquid ammonia). The fluid of the fuel storage tank 3 can comprise liquid and can be outputtable from the fuel storage tank via a feed pump 5 connected to the fuel storage tank 3 via a feed pump conduit 2 connected between the feed pump 5 and the fuel storage tank 3. The feed pump 5 can be positioned to help drive a flow of the fuel toward the gas turbine 11. For example, the feed pump 5 can increase the pressure of the fuel within the fuel storage tank 3 to a pre-selected operational pressure for feeding the fuel to the gas turbine 11. Such a pre-selected operational pressure can be a pressure within a range of 40 atm and 80 atm, between 20 atm and 60 atm, between 20 atm and 80 atm, or other suitable pressure range.

For example, the feed pump 5 can be connected to a vaporizer feed conduit 4a that is connected between the feed pump 5 and the vaporizer 7. At least a portion of the fuel can be fed to the vaporizer via the vaporizer feed conduit 4a for being vaporized so that the fuel can be output from the vaporizer 7 via a vaporizer output conduit 6 connected to the vaporizer so that the fuel can be output from the vaporizer 7 as a gas for being fed to a combustion chamber of the gas turbine as a gaseous fuel. The heating medium for the vaporizer 7 for heating the fuel to vaporize it can be ambient air, an industrial process gas, or other suitable heating medium. A combustion chamber feed conduit 6b (shown in broken line in FIG. 1) can be connected between a vaporizer output conduit 6 and the gas turbine 11 for feeding the vaporized fuel output from the vaporizer to the gas turbine.

The feed pump 5 can also be connected to an inlet filter unit feed conduit 4b that is connected between an inlet filter unit 9 and the feed pump 5. A portion of the fuel output from the feed pump 5 can be passed to the inlet filter unit 9 via this conduit to be vaporized via air being passed through the inlet filter unit 9. A valve V can be positioned to adjust how much of the fuel output from the feed pump 5 is passed to the inlet filter unit 9. For example, the valve V can be connected to the inlet filter unit feed conduit 4b at a position between the inlet filter unit 9 and the feed pump 5. The valve V can be adjustable from a closed position in which no fuel is fed to the inlet filter unit 9 and an open position in which a portion of the fuel is passed to the inlet filter unit 9 for being vaporized therein. A controller (not shown) having a processor connected to a non-transitory memory and at least one transceiver can be communicatively connected to the valve to actuate adjustment of the valve to different positions between its closed and open position.

When a portion of the fuel is passed to the inlet filter unit 9, another portion of the fuel can still be passed to the vaporizer 7 for being vaporized and subsequently fed to the gas turbine 11. In situations where the valve V is closed, all the fuel output from the feed pump 5 can be passed to the vaporizer 7 to be vaporized and subsequently fed to the gas turbine 11.

In some embodiments, it is contemplated that the valve V and conduits connected to the feed pump 5 can be arranged so that when the valve V is in a fully opened position, all the fuel is passed to the inlet filter unit 9 for being vaporized therein and the vaporizer 7 is not utilized for vaporizing the fuel in such an operational state. In such an embodiment, the vaporizer feed conduit 4a can also include a valve that can be closed to help facilitate such a flow of the fuel to the inlet filter unit 9.

Air can be passed into the inlet filter unit 9 to be filtered and subsequently output as a filtered air flow FA for being fed to the combustion chamber of the gas turbine as a flow of oxidant. A compressor or fan can be connected to an air feed conduit connected to the inlet filter unit 9 for feeding the air into the inlet filter unit 9. The air output as filtered air flow FA can be at a pre-selected air feed temperature. The pre-selected air feed temperature can be a temperature within a suitable pre-selected range of feed temperatures (e.g. a temperature of between 15° C. and 20° C., a temperature of between 0° C. and 30° C., etc.).

An oxidant feed conduit can be positioned between the gas turbine 11 and the inlet filter unit 9 to feed the filtered air flow FA that is output from the inlet filter unit 9 to the combustion chamber of the gas turbine 11. The inlet filter unit can include multiple filter elements (e.g. first filter element 9a and a second filter element 9b, a first filter element 9a, second filter element 9b and a third filter element 9c, etc.) and also include a filter unit heat exchanger HX that can be integrated into the inlet filter unit 9 to cool the air being filtered and also vaporize the portion of the fuel passed into the inlet filter unit 9 via the inlet filter unit feed conduit 4b.

The fuel vaporized in the inlet filter unit 9 can be output from the inlet filter unit 9 as a gas for being fed to the gas turbine via a combustion chamber feed conduit 8 so that a first feed of vaporized fuel 10 can be fed to the combustion chamber of the gas turbine 11. In some embodiments, the first feed of vaporized fuel can include the fuel output from the vaporizer 7. In other embodiments, a second feed of vaporized fuel can be fed to the combustion chamber via the combustion chamber feed conduit 6b connected between the gas turbine 11 and the vaporizer 7 so that the gaseous fuel output from the vaporizer 7 is a second feed of fuel.

For instance, in some arrangements or operational situations, the combustion chamber feed conduit 6b may not be utilized (or be present at all) and the gaseous fuel output from the vaporizer 7 can be fed to the gas turbine via the combustion chamber feed conduit 8. In such a configuration or arrangement, a combustion chamber feed conduit connecting conduit 6a can be connected between the combustion chamber feed conduit 8 and the vaporizer output conduit 6 so that the gaseous fuel output from the vaporizer 6 can be passed into the combustion chamber feed conduit 8 for being fed to the combustion chamber of the gas turbine as the first feed of vaporized fuel 10 or as a portion of the first feed of vaporized fuel 10 that is mixed with another portion of vaporized fuel output from the inlet filter unit 9 (when fuel is fed to the inlet filter unit 9 for vaporization and subsequently being fed to the gas turbine 11).

In situations where the fuel output from the inlet filter unit 9 is mixed with the gaseous fuel output from the vaporizer 7, the mixing can be provided via mixing device (e.g. in-line mixer, other type of mixing device) included in the combustion chamber feed conduit 8. Such a situation can occur when the valve V of the inlet filter unit feed conduit 4b is opened or in an open position for feeding fuel to the inlet filter unit for being heated therein, for example. Such mixing can be beneficial in some situations or operational conditions to help ensure that the heated fuel output from the inlet filter unit is fully vaporized via the mixing as heat from the fuel output form the vaporizer can be transferred to any fuel that may not be fully vaporized output from the inlet filter unit 9.

The gas turbine 11 can receive the filter air flow FA and the feed of gaseous fuel output from the vaporizer 7 and/or the inlet filter unit 9 for combusting the fuel in the combustion chamber of the gas turbine 11. Combustion of the fuel can drive rotation of at least one shaft as exhaust gas that includes the combustion products from the combusted fuel is output from the gas turbine 11 as a stream of exhaust (Exhaust). The exhaust can be vented to atmosphere directly or after being passed through an exhaust treatment system.

The inlet filter unit 9 having multiple filter elements and a heat exchanger HX for vaporization of gas turbine fuel that can be fed into the heat exchanger can have different configurations. FIGS. 2, 3, 4, and 5 illustrate different examples of different inlet filter unit 9 configurations that can be utilized in the turbine apparatus 1 and the apparatus for filtering and cooling air to be fed to a gas turbine while also vaporizing at least a portion of fuel to be fed to the gas turbine 21 that can be included in a turbine apparatus 1. Such inlet filter units 9 can be considered filter houses or be considered as another type of filter device.

Figure 2:
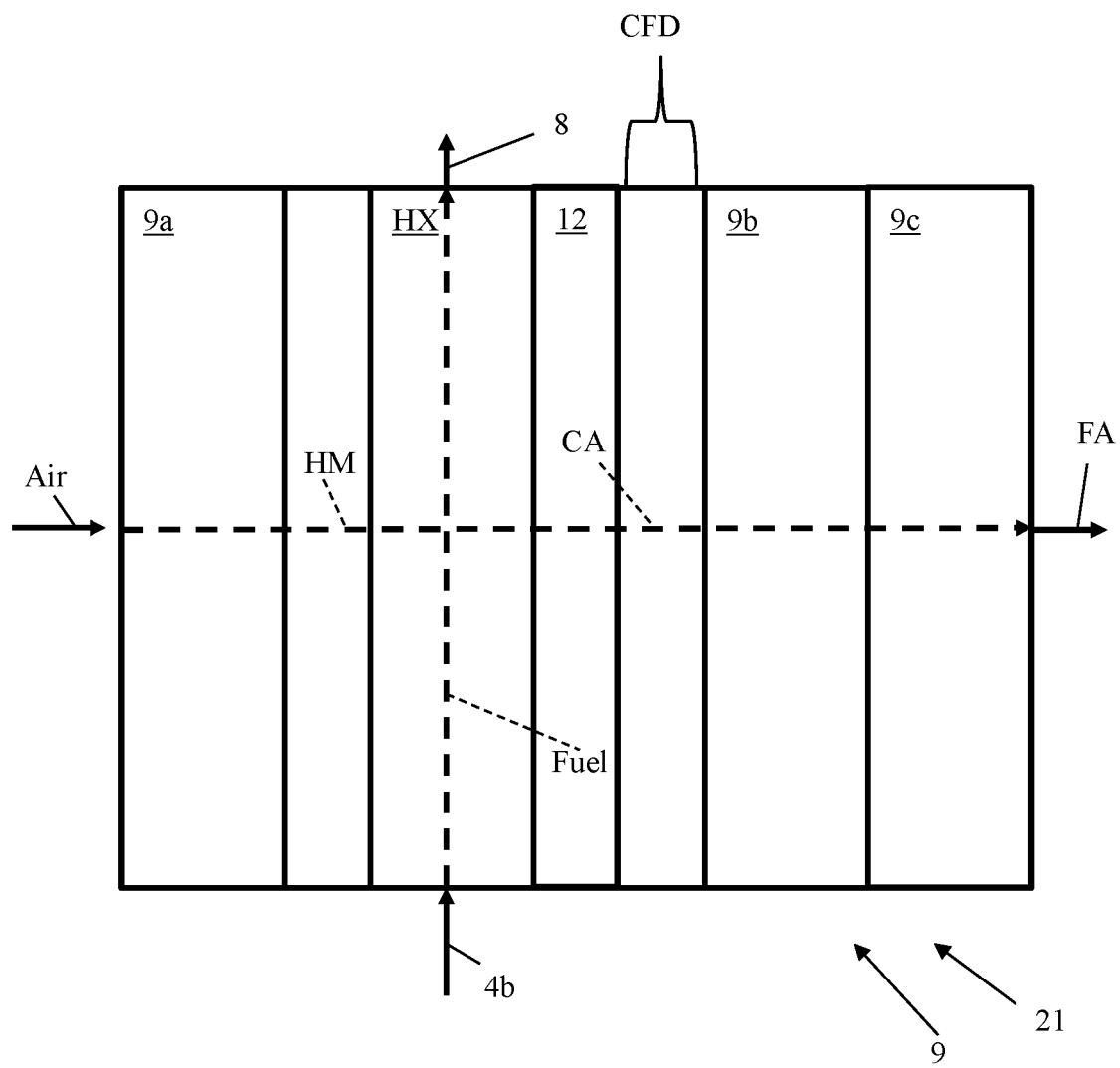
FIG. 2 is a block diagram of a first exemplary embodiment of an inlet filter unit 9 that can be utilized in the first exemplary embodiment of the gas turbine apparatus 21.

FIG. 2 illustrates a first exemplary embodiment of an inlet filter unit 9 that is configured to filter air via multiple filter elements and also cool the air via a heat transfer with fuel passed through a heat exchanger HX of the inlet filter unit 9 positioned between filter elements of the inlet filter unit 9. For example, the air can be passed through a first filter element 9a positioned upstream of the heat exchanger HX. The first filter element 9a can include one or more mesh elements or other type of particulate removal members for removal of particulates from the air. Some embodiments of the first filter element 9a can also be configured to remove rain from the air as well. The removal of particulates and/or rain from the air can help protect the heat exchanger HX by preventing fouling of heat exchanger elements. The air passed through the first filter element 9a can be passed through the heat exchanger HX as a heating medium HM that can transfer heat of the warmer air to the liquid fuel passing through the heat exchanger (Fuel) to vaporize the fuel. The air that is passed out of the heat exchanger HX can be a cooled air flow CA that is subsequently passed through a second filter element 9b and a third filter element 9c.

In some embodiments, the second filter element 9b can be configured to coalesce or otherwise separate liquid water from the air to prevent liquid water that may be within the air as liquid water from migrating out of the inlet filter unit 9 to the combustion chamber of the gas turbine 11 (e.g. maintain liquid water within the filtered air flow FA output from the inlet filter unit 9 to a level that is at or below a pre-selected liquid water content threshold, such as no liquid water or a minimal amount of liquid water). The second filter element 9b can be a water coalescer, moisture separator or other type of suitable water removal filter.

The third filter element 9c can be a hydrophobic filter configured to remove fine particulates from the air while also helping to remove liquid water from the air as well. The downstream third filter element 9c can help maintain the filtered air output from the inlet filter unit 9 so it has a liquid water content that is at or below a pre-selected liquid water content threshold and also has a particulate content that is at or below a pre-selected particulate content for the filtered air flow FA. In some embodiments, the filter elements can be arranged and configured so that a relatively small amount of tiny particulates may exit the inlet filter unit (e.g. sub-micron sized particulate material, etc.).

The inlet filter unit 9 can also include a condensate drainage system 12 positioned adjacent to the heat exchanger HX and downstream of the heat exchanger HX to help remove condensate that can form when the air contacts one or more cold coils or heat transfer conduits of the heat exchanger HX through which the liquid fuel can pass. The formed condensate that is drained can include liquid water that may condense from the air as it contacts the one or more heat transfer conduits through which the fuel passes, for example.

The inlet filter unit 9 can be arranged and configured so that there is a pre-selected condensate falling distance CFD of space between the heat exchanger HX (or the condensate drainage system 12) and the second filter element 9b downstream of the heat exchanger. The condensate falling distance CFD can be selected to facilitate the fall of condensate from within the cooled air flow CA so that the condensate can fall and/or agglomerate to help facilitate filtration via the second filter element 9b and/or third filter element 9c downstream of the heat exchanger HX. Preferably, the pre-selected condensate falling distance CFD is selected so that most of the condensate can fall out of the air prior to reaching the downstream second filter element 9b, which can also help reduce the pressure drop that can occur from the air passing through the filter element.

Figure 3:
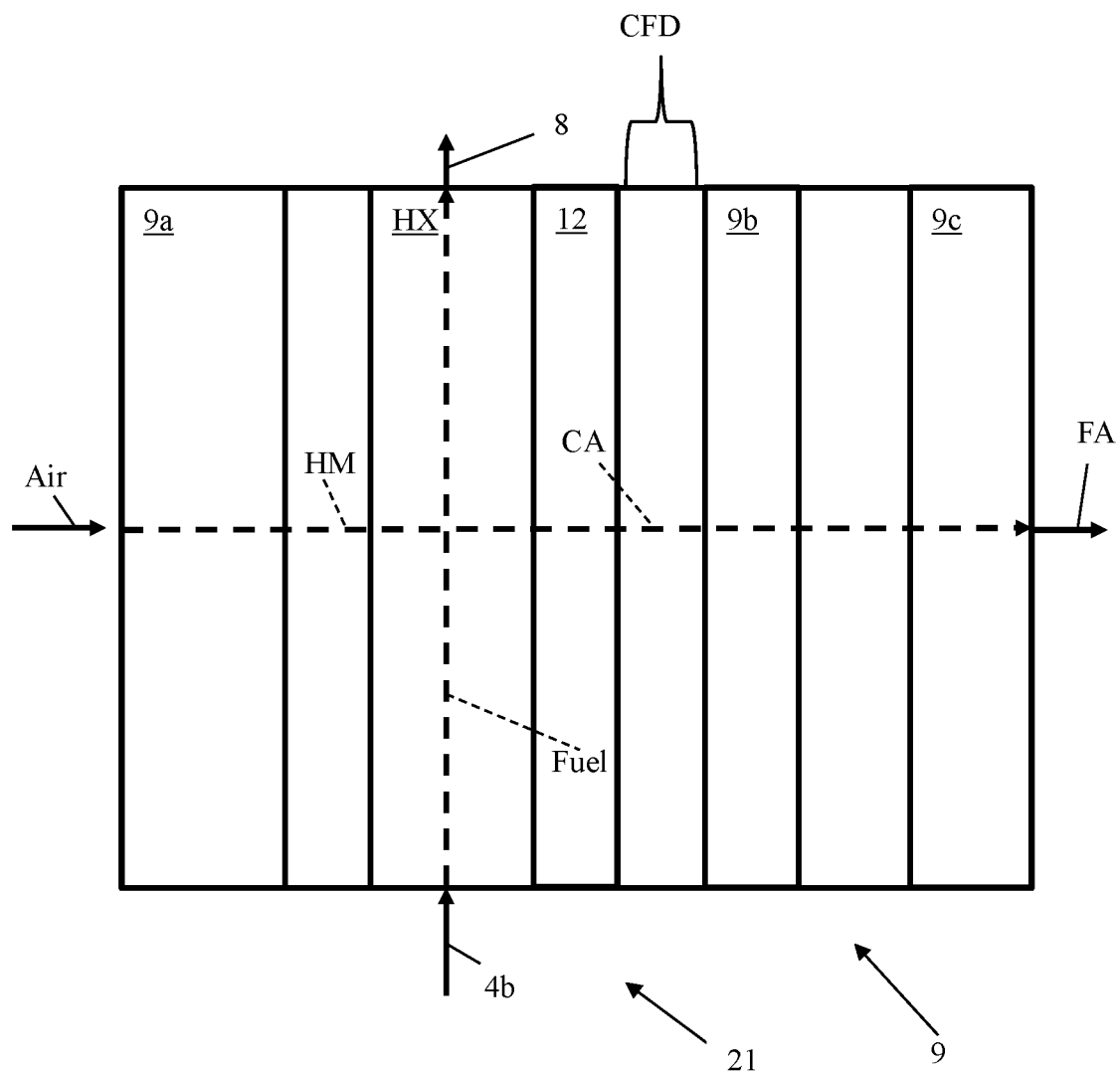
FIG. 3 is a block diagram of a second exemplary embodiment of an inlet filter unit 9 that can be utilized in the first exemplary embodiment of the gas turbine apparatus 21.

In the inlet filter unit 9 of FIG. 2, the second and third filter elements 9b and 9c can be positioned or staged on the same filter wall to help reduce the size of the inlet filter unit 9, which can help reduce capital costs. FIG. 3 illustrates an alternative in which the second and third filter elements are positioned in a spaced apart relation where the second filter element 9b is positioned between the heat exchanger HX and the third filter element within the housing of the inlet filter unit 9 and is spaced apart from the downstream third filter element.

Figure 4:
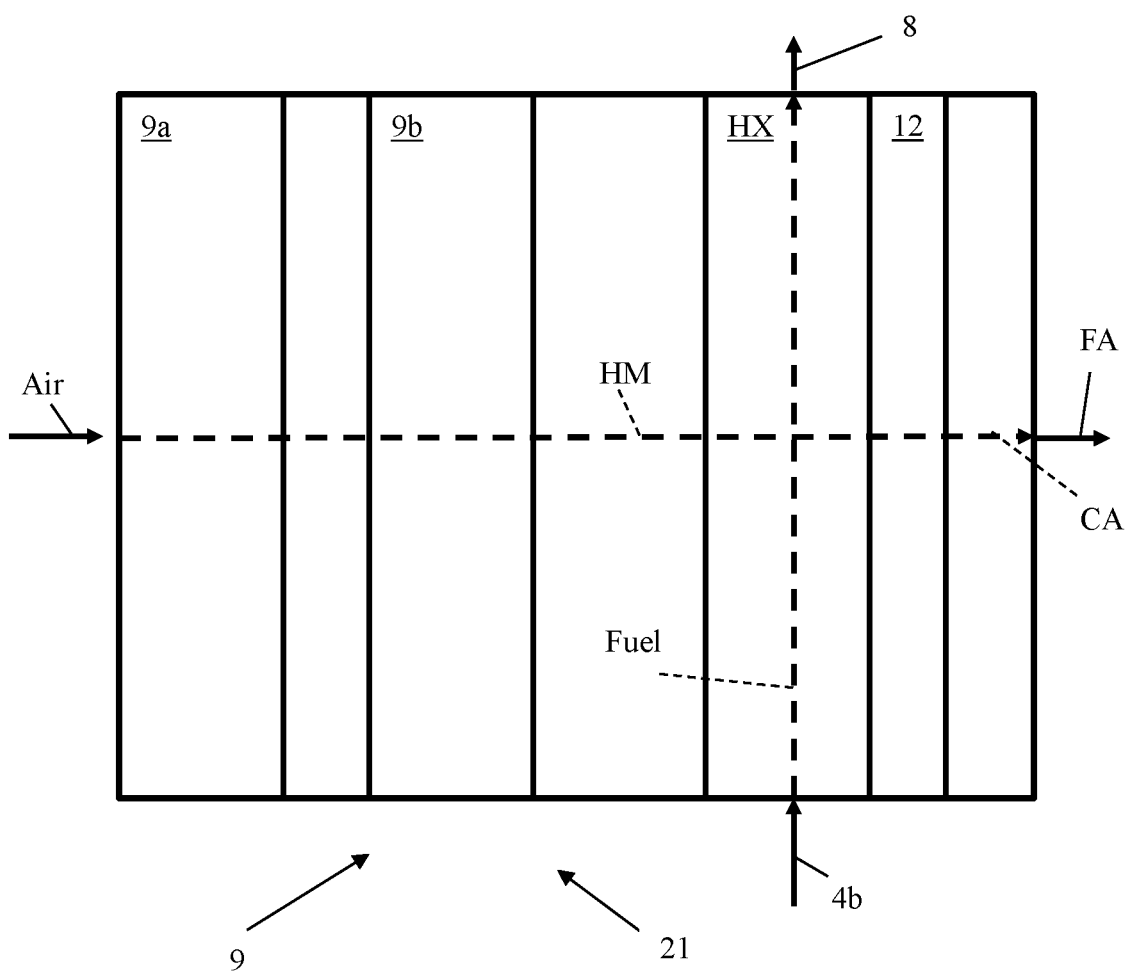
FIG. 4 is a block diagram of a third exemplary embodiment of an inlet filter unit 9 that can be utilized in the first exemplary embodiment of the gas turbine apparatus 21.

FIG. 4 illustrates another embodiment of the inlet filter unit 9 in which the heat exchanger HX of the inlet filter unit 9 can be downstream of both the first filter element 9a and the second filter element 9b. In this exemplary embodiment, the first filter element 9a can be positioned upstream of the heat exchanger HX and upstream of the second filter element 9b. The first filter element 9a can include one or more mesh elements or other type of particulate removal members for removal of particulates from the air.

The second filter element 9b that is upstream of the heat exchanger HX and downstream of the first filter element 9a can be configured as a hydrophobic filter configured to remove fine particulates from the air while also helping to remove liquid water from the air as well. The second filter element 9b can be positioned to help maintain the filtered air output from the inlet filter unit 9 so it has a liquid water content that is at or below a pre-selected liquid water content threshold and also has a particulate content that is at or below a pre-selected particulate content for the filtered air flow FA.

The heat exchanger HX can be positioned downstream of the second filter element 9b so that the air passed through the second filter element 9b can function as a heating medium HM and pass along the one or more coils or other heat transfer conduits of the heat exchanger through which the fuel passes to heat the fuel (and thereby cool the air) to form the cooled air flow CA. A condensate drainage system 12 can be positioned downstream of the heat exchanger HX to help remove any condensate that may form as the air contacts the cold heat transfer conduits of the heat exchanger HX through which the fuel passes. The cooled air flow CA can be output from the inlet filter unit 9 as the filtered air flow FA after passing through the heat exchanger HX or after passing the condensate drainage system 12 without passing through any further downstream filter elements.

While the embodiment of FIG. 4 can be utilized in some embodiments, it may not be ideal for some operational situations. For example, it is contemplated that having the heat exchanger HX downstream of the first and second filter elements 9a and 9b could result in permitting some moisture to pass out of the inlet filter unit 9 and be within the filtered air flow FA. In some situations, it is possible the liquid water content that may be present could exceed a desired or preferred liquid water content level for the filter air flow FA to be fed to the gas turbine 11. This is not preferred because the presence of liquid water can cause erosion or other issues at the compression side of the gas turbine 11 and/or could cause other issues that may be undesirable for gas turbine performance.

Figure 5:
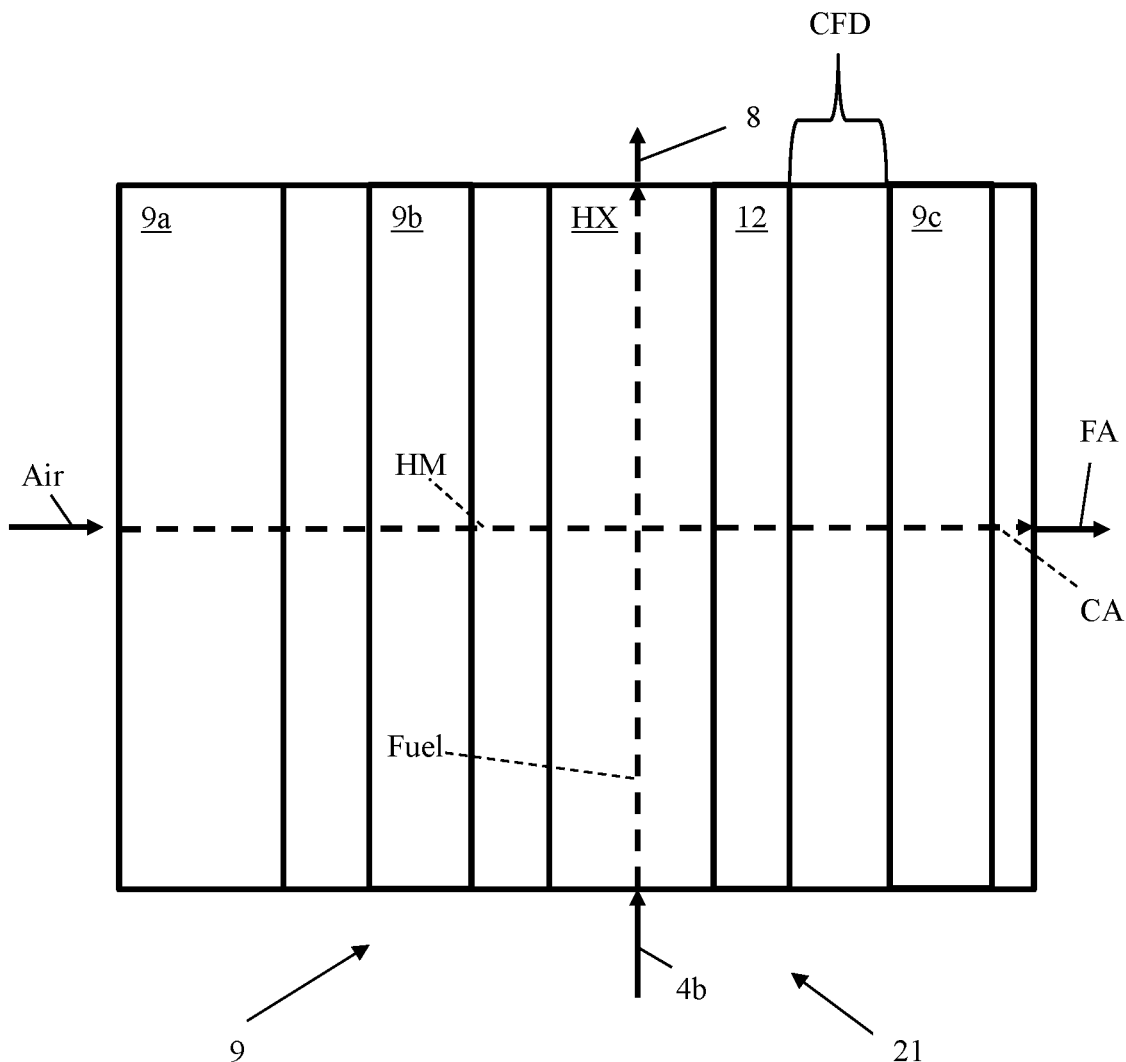
FIG. 5 is a block diagram of a fourth exemplary embodiment of an inlet filter unit 9 that can be utilized in the first exemplary embodiment of the gas turbine apparatus 21.

FIG. 5 illustrates yet another embodiment of the inlet filter unit 9 in which the heat exchanger HX of the inlet filter unit 9 can be downstream of both the first filter element 9a and the second filter element 9b and also be upstream of a third filter element 9c. In the exemplary configuration of FIG. 5, the first filter element 9a can be positioned upstream of the heat exchanger HX and upstream of the second filter element 9b. The first filter element 9a can include one or more mesh elements or other type of particulate removal members for removal of particulates from the air. Also, the second filter element 9b that is upstream of the heat exchanger HX and downstream of the first filter element 9a can be configured as a hydrophobic filter configured to remove fine particulates from the air while also helping to remove liquid water from the air as well. The second filter element 9b can be positioned to help maintain the filtered air output from the inlet filter unit 9 so it has a liquid water content that is at or below a pre-selected liquid water content threshold (e.g. no liquid water and no liquid condensate, etc.) and also has a particulate content that is at or below a pre-selected particulate content for the filtered air flow FA. Prevention of liquid water from passing through all the filter elements of the inlet filter unit 9 can be beneficial in some embodiments by helping to prevent salt that may be within the air from egressing through the filter elements and slipping past the inlet filter unit 9, which can contribute to corrosion or other degradation of downstream gas turbine equipment.

The heat exchanger HX can be positioned downstream of the second filter element 9b and also be positioned upstream of a third filter element 9c so that the air passed through the second filter element 9b can function as a heating medium HM and pass along the one or more coils or other heat transfer conduits of the heat exchanger through which the fuel passes to heat the fuel (and thereby cool the air) to form the cooled air flow CA. A condensate drainage system 12 can be positioned downstream of the heat exchanger HX to help remove any condensate that may form as the air contacts the cold heat transfer conduits of the heat exchanger HX through which the fuel passes.

The third filter element 9c can be positioned downstream of the heat exchanger. The third filter element 9c can also be spaced apart from the heat exchanger HX or condensate drainage system 12 by a pre-selected condensate falling distance CFD of space so that condensate from within the cooled air flow CA can fall and/or agglomerate to help facilitate filtration via the third filter element 9c downstream of the heat exchanger HX. Preferably, the pre-selected condensate falling distance CFD is selected so that most of the condensate can fall out of the air prior to reaching the downstream third filter element 9c, which can also help reduce the pressure drop that can occur from the air passing through the filter element. The third filter element 9c can be configured to coalesce or otherwise separate liquid water from the air of the cooled air flow CA after it has passed downstream of the heat exchanger HX to prevent liquid water that may be within the air from migrating out of the inlet filter unit 9 to the combustion chamber of the gas turbine 11 (e.g. maintain liquid water within the filtered air flow FA output from the inlet filter unit 9 to a level that is at or below a pre-selected liquid water content threshold). The third filter element 9c can be a water coalescer, moisture separator or other type of suitable water removal filter.

Figure 6:
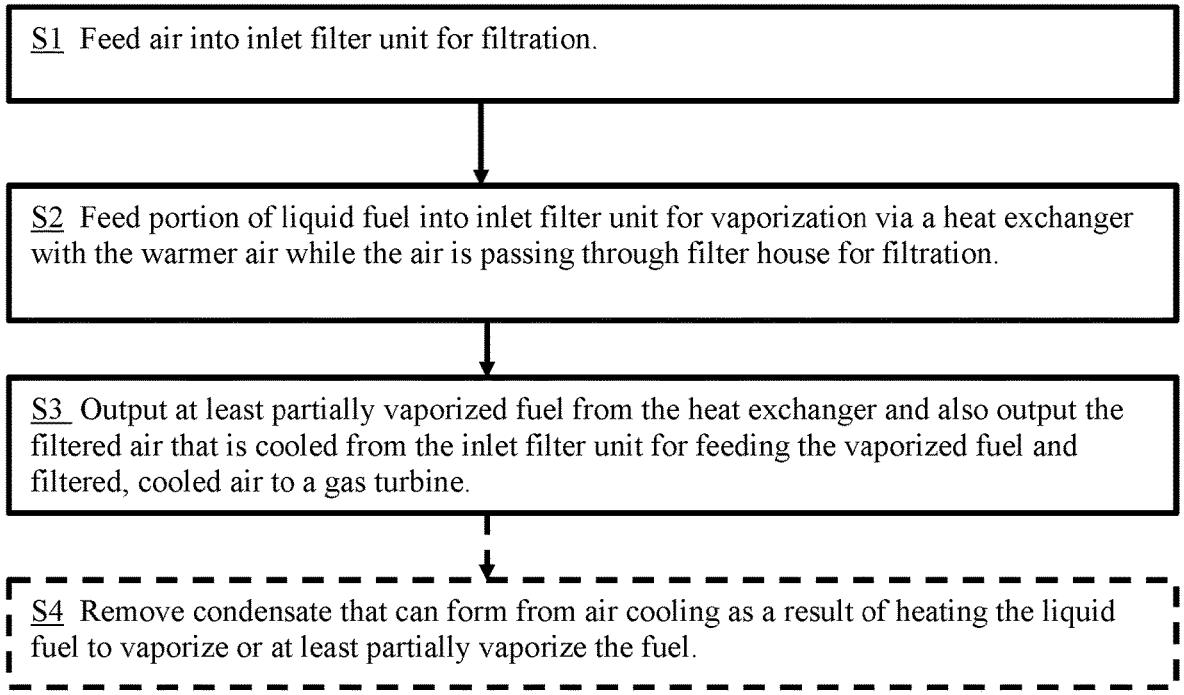
FIG. 6 is a flow chart illustrating a first exemplary embodiment of a process for filtering and cooling air to be fed to a gas turbine while also vaporizing at least a portion of fuel to be fed to the gas turbine. Embodiments of this process can be implemented in embodiments of the inlet filter unit 9, gas turbine apparatus 1 and/or apparatus for filtering and cooling air to be fed to a gas turbine while also vaporizing at least a portion of fuel to be fed to the gas turbine.

An embodiment of our process for filtering and cooling air to be fed to a gas turbine while also vaporizing at least a portion of fuel to be fed to the gas turbine that can be implemented via an embodiment of the turbine apparatus 1 and/or apparatus for filtering and cooling air to be fed to a gas turbine while also vaporizing at least a portion of fuel to be fed to the gas turbine 21 is illustrated in FIG. 6. It should be appreciated that the process can also include other steps in addition to the steps illustrated in FIG. 6 to meet a particular set of design objectives.

In a first step S1, air can be fed into an inlet filter unit 9 (e.g. a filter house or other type of inlet filter unit 9) for filtration. The filtration of the air can remove particulates or can remove particulates and liquid water from the air. Such filtration can be provided by a first filter element 9a, second filter element 9b, and/or a third filter element 9c as discussed above, for example.

In a second step S2, a portion of liquid fuel can be fed into the inlet filter unit 9 (e.g. filter house or other type of inlet filter unit 9). The fuel can be fed into the inlet filter unit for vaporization of the fuel via a heat exchange with the air passed through the inlet filter unit 9 as discussed above, for example. The passing of the fuel into the heat exchanger of the inlet filter unit 9 can occur while the air is being filtered in the inlet filter unit 9.

In a third step S3, at least partially vaporized fuel can be output from the inlet filter unit's heat exchanger HX and filter air (e.g. filtered air flow FA) that is cooled can be output from the inlet filter unit 9 for feeding the vaporized fuel and the filtered, cooled air to the gas turbine 11. Examples of the outputting of the filtered, cooled air and the vaporized fuel from the inlet filter unit 9 to the gas turbine 11 are discussed above.

In an optional fourth step S4, at least some condensate that can form from the air cooling in the inlet filter unit 9 can be removed. The removal of the condensate can be provided via at least one filter element and/or a condensate drainage system 12 as discussed above, for example. The removal of the condensate can remove at least some of the condensate from the air so that the air output from the inlet filter unit no longer has such condensate or has a relatively low amount of condensate entrained therein.

Embodiments of the process and apparatus can utilize a distributed control system (DCS) or automated process control system to monitor and/or control operations. A controller of such a system can be utilized to control how much of the fuel is fed to the gas turbine 11 and what proportion of the fuel is fed to the vaporizer 7 for vaporization and how much of the fuel is fed to the inlet filter unit 9 for vaporization of the fuel and cooling of the air. Such control operations can be based on sensor data obtained from different sensors of the apparatus and/or operator input that can be provided to controller of the control system. For example, a temperature sensor can be positioned adjacent a discharge outlet of the inlet filter unit 9 to measure the filtered air temperature of the filter air flow FA output from the inlet filter unit 9. Such temperature data can be provided to a controller for use in modulating the flow of liquid fuel fed to the inlet filter unit 9 (e.g. if the temperature of the filtered air flow is over a pre-selected high temperature threshold, more fuel can be fed to the inlet filter unit's heat exchanger and if the temperature is below a pre-selected low temperature threshold, less fuel can be fed to the inlet filter unit's heat exchanger).

Embodiments of our process and apparatus can be configured so that heat that may be required to vaporize a fuel for being fed to a gas turbine can utilize air to be fed to the gas turbine as an oxidant flow to provide a more energy efficient fuel vaporization scheme that can help reduce costs and environmental impacts associated with the user of other options for heating the fuel (e.g. electric heat vaporizers, etc.). Further, the cooling of the oxidant to be fed to the combustion chamber of the gas turbine can provide a benefit as it can help increase the air mass flow rate fed to the combustion chamber of the gas turbine 11, which can improve gas turbine performance. This can be particularly advantageous in in warmer climates that have higher temperature ambient air.

Further, we have found that by vaporization of the fuel within the inlet filter unit, the heat exchange process used for vaporization can be more efficient and require less maintenance. For instance, the removal of particulates upstream of the heat exchanger HX within the inlet filter unit 9 can remove particulates from the air, which can avoid fouling or other degradation issues. We have found that the use of the inlet air within the inlet filter unit 9 to vaporize the fuel can help reduce the energy required to vaporize the fuel while simultaneously cooling the inlet air to be fed to the gas turbine as an oxidant to increase turbine performance.

Embodiments can also provide improved operational flexibility for the turbine apparatus 1. For example, in some operational situations, it may not be desired to utilize the inlet filter unit for vaporization of fuel. This may occur, for example, during a turbine startup operation or due to maintenance work that may be needed for the heat exchanger HX of the inlet filter unit 9. In such situations, the valve V of the inlet filter unit feed conduit 4b can be closed and all the fuel can be fed to the vaporizer 7 for providing the vaporized fuel to the gas turbine 11.

The valve V of the inlet filter unit feed conduit 4b can subsequently be adjusted to an open position when it is advantageous to have at least some of the fuel vaporized via the air passed through the inlet filter unit 9. The use of the inlet filter unit 9 for cooling of air and vaporization of at least some of the fuel to be fed to the gas turbine 11 can be adapted to meet ambient operational conditions and the operational demand for the gas turbine 11 to provide improved operational flexibility that can reduce turbine downtime and provide improved turbine performance.

As noted above, the turbine apparatus 1 can be configured for operation at a pre-selected operational pressure. This pre-selected operational pressure can be a suitable pressure selected to account for the size of the turbine apparatus, fuel to be combusted therein, and other design criteria. Operational temperatures within a pre-selected temperature range can also be selected based on the types of fuel to be combusted, flow of air to be fed to the gas turbine 11, size of the gas turbine 11, and other design criteria.

Embodiments of our process, apparatus, and system can be adapted for different turbine apparatus design criteria. For example, it should be appreciated that other embodiments can utilize different types of conduit arrangements, fuel storage tanks, types of liquid fuel (e.g. liquid ammonia, liquid natural gas, etc.). As another example, some inlet filter units 9 may only include a single filter element (e.g. a jet pulse filter, etc.) while others may include more than 2 filter elements, more than 3 filter elements, or more than 4 filter elements. As yet another example, some inlet filter units 9 can include a vane separator or other type of moisture removal device adjacent the inlet of the inlet filter unit 9 to help remove moisture from the air. It should also be appreciated that other modifications can also be made to meet a particular set of criteria for different embodiments of the turbine apparatus 1 or apparatus for filtering and cooling air to be fed to a gas turbine while also vaporizing at least a portion of fuel to be fed to the gas turbine 21.

It should therefore be appreciated that modifications to the embodiments explicitly shown and discussed herein can be made to meet a particular set of design objectives or a particular set of design criteria. For instance, the arrangement of valves, piping, and other conduit elements (e.g., conduit connection mechanisms, tubing, seals, valves, etc.) for interconnecting different units of the apparatus for fluid communication of the flows of fluid between different elements (e.g., pumps, valves, conduits, compressors, etc.) can be arranged to meet a particular plant layout design that accounts for available area of the apparatus, sized equipment of the apparatus, and other design considerations. As another example, the flow rate, pressure, and temperature of the fluid passed through the various apparatus or system elements can vary to account for different design configurations and other design criteria.

Embodiments of the gas turbine apparatus 1, process for operation of a gas turbine, apparatus for filtering and cooling air to be fed to a gas turbine while also vaporizing at least a portion of fuel to be fed to the gas turbine, and process for filtering and cooling air to be fed to a gas turbine while also vaporizing at least a portion of fuel to be fed to the gas turbine can each be configured to include process control elements positioned and configured to monitor and control operations (e.g., temperature and pressure sensors, flow sensors, an automated process control system having at least one work station that includes a processor, non-transitory memory and at least one transceiver for communications with the sensor elements, valves, and controllers for providing a user interface for an automated process control system that may be run at the work station and/or another computer device of the plant, etc.). It should be appreciated that embodiments can utilize a distributed control system (DCS) for implementation of one or more processes and/or controlling operations of an apparatus or process as well.

As another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of the process, apparatus, system, and methods of making and using the same have been shown and described above, it is to be distinctly understood that the invention is not limited thereto but may be otherwise variously embodied and practiced within the scope of the following claims.

What is claimed is:

1. A process for filtering and cooling air to be fed to a gas turbine of a gas turbine apparatus while also vaporizing at least a portion of fuel to be fed to the gas turbine, the gas turbine apparatus comprising:
   an inlet filter unit having a first filter element, a second filter element positioned downstream of the first filter element, and a third filter element positioned downstream of the second filter element, the inlet filter unit also having a heat exchanger positioned downstream of the first filter element and upstream of the second filter element to receive liquid fuel from a fuel storage tank to vaporize the fuel via air passed through the inlet filter unit and to cool the air, the heat exchanger having at least one heat transfer conduit through which the fuel is passable, the at least one heat transfer conduit being positioned to contact the air as the air passes through the inlet filter unit;
   the first filter element configured to remove particulates from the air;
   the second filter element configured to remove water from the air, the second filter element being positioned a pre-selected distance downstream of the heat exchanger so that more than 50% of condensate within the air passable from the heat exchanger to the second filter element falls out of the air and/or aglomerates to facilitate filtration of the condensate via the second filter element and/or the third filter element;
   the third filter element configured to remove particulates from the air so the air has a particulate content that is at or below a pre-selected particulate content threshold;
   the inlet filter unit being positionable to output air after the air is passed through the first filter element, the heat exchanger, the second filter element, and the third filter element to feed the air to a combustion chamber of a gas turbine; and
   the heat exchanger of the inlet filter unit being configured and positioned to output the fuel so the fuel is at least partially vaporized for feeding to the combustion chamber of the gas turbine:
   the process comprising:
   feeding air into the inlet filter unit for filtration of the air;
   feeding a portion of liquid fuel into the heat exchanger for vaporization of the portion of the fuel and cooling of the air passing through the inlet filter unit via heat exchange between the air and the fuel;
   outputting at least partially vaporized fuel from the heat exchanger to the gas turbine; and
   outputting cooled filtered air from the inlet filter unit to the gas turbine.

2. An apparatus for filtering and cooling air to be fed to a gas turbine while also vaporizing at least a portion of fuel to be fed to the gas turbine, the apparatus comprising:
   an inlet filter unit having a first filter element, a second filter element positioned downstream of the first filter element, and a third filter element positioned downstream of the second filter element, the inlet filter unit also having a heat exchanger positioned downstream of the first filter element and upstream of the second filter element to receive liquid fuel from a fuel storage tank to vaporize the fuel via air passed through the inlet filter unit and to cool the air, the heat exchanger having at least one heat transfer conduit through which the fuel is passable, the at least one heat transfer conduit being positioned to contact the air as the air passes through the inlet filter unit;
   the first filter element configured to remove particulates from the air;
   the second filter element configured to remove water from the air, the second filter element being positioned a pre-selected distance downstream of the heat exchanger so that more than 50% of condensate within the air passable from the heat exchanger to the second filter element falls out of the air and/or agglomerates to facilitate filtration of the condensate via the second filter element and/or the third filter element;
   the third filter element configured to remove particulates from the air so the air has a particulate content that is at or below a pre-selected particulate content threshold;

the inlet filter unit being positionable to output air after the air is passed through the first filter element, the heat exchanger, the second filter element, and the third filter element to feed the air to a combustion chamber of a gas turbine; and the heat exchanger of the inlet filter unit being configured and positioned to output the fuel so the fuel is at least partially vaporized for feeding to the combustion chamber of the gas turbine.

3. The apparatus of claim 2, wherein the second filter element is a water coalescer or a moisture separator.

4. The apparatus of claim 3, wherein the third filter element is a hydrophobic filter that is configured to remove the particulates from the air and also liquid water from the air so that the air output from the inlet filter unit has a liquid water content that is at or below a pre-selected liquid water content threshold.

5. The apparatus of claim 4, wherein the pre-selected liquid water content threshold permits no liquid water within the air output from the inlet filter unit.

6. The apparatus of claim 2, wherein the second filter element is positioned the pre-selected distance downstream of the heat exchanger so that more than 50% of condensate within the air passing from the heat exchanger to the second filter element falls out of the air.

7. The apparatus of claim 2, wherein the inlet filter unit has a condensate drainage system positioned downstream of the heat exchanger.

8. The apparatus of claim 2, wherein the inlet filter unit has a condensate drainage system positioned to drain the condensate that forms on the at least one heat transfer conduit of the heat exchanger when the air contacts the at least one heat transfer conduit.

9. The apparatus of claim 8, wherein the condensate that forms on the at least one heat transfer conduit of the heat exchanger includes liquid water.

10. A turbine apparatus, comprising:
   a gas turbine; and
   an inlet filter unit having a first filter element, a second filter element positioned downstream of the first filter element, and a third filter element positioned downstream of the second filter element, the inlet filter unit also having a heat exchanger positioned downstream of the first filter element and upstream of the second filter element to receive liquid fuel to vaporize the fuel via air passed through the inlet filter unit to cool the air, the heat exchanger having at least one heat transfer conduit through which the fuel is passable, the at least one heat transfer conduit being positioned to contact the air as the air passes through the inlet filter unit;
   the first filter element configured to remove particulates from the air;
   the second filter element configured to remove water from the air, the second filter element being positioned a pre-selected distance downstream of the heat exchanger so that more than 50% of condensate within the air passable from the heat exchanger to the second filter element falls out of the air and/or aglomerates to facilitate filtration of the condensate via the second filter element and/or the third filter element;
   the third filter element configured to remove particulates from the air so the air has a particulate content that is at or below a pre-selected particulate content threshold;
   the inlet filter unit being positionable to output air after the air is passed through the first filter element, the heat exchanger, the second filter element, and the third filter element to feed the air to a combustion chamber of the gas turbine; and
   the heat exchanger being configured and positioned to output the fuel so the fuel is vaporized for feeding to the combustion chamber of the gas turbine.

11. The turbine apparatus of claim 10, wherein the second filter element is a water coalescer or a moisture separator.

12. The turbine apparatus of claim 11, wherein the third filter element is a hydrophobic filter that is configured to remove the particulates from the air and also liquid water from the air so that the air output from the inlet filter unit has a liquid water content that is at or below a pre-selected liquid water content threshold.

13. The turbine apparatus of claim 12, wherein the pre-selected liquid water content threshold permits no liquid water within the air output from the inlet filter unit.

14. The turbine apparatus of claim 10, wherein the second filter element is positioned the pre-selected distance downstream of the heat exchanger so that more than 50% of condensate within the air passing from the heat exchanger to the second filter element falls out of the air.

15. The turbine apparatus of claim 14, wherein the second filter element is positioned the pre-selected distance downstream of the heat exchanger so that some of the condensate agglomerates to facilitate filtration of the condensate via the second filter element and the third filter element.

16. The turbine apparatus of claim 14, comprising:
   a fuel storage tank that is positioned and configured to feed the fuel to the heat exchanger, wherein the fuel is comprised of hydrogen or ammonia.

17. The apparatus of claim 6, wherein the second filter element is positioned the pre-selected distance downstream of the heat exchanger so that some of the condensate agglomerates to facilitate filtration of the condensate via the second filter element and the third filter element.

18. The apparatus of claim 17, wherein the fuel is comprised of ammonia or hydrogen.

19. The apparatus of claim 18, wherein the fuel is comprised of ammonia.

* * * * *